United States Patent
Dostál et al.

(10) Patent No.: US 12,066,195 B2
(45) Date of Patent: Aug. 20, 2024

(54) ONE-PIPE HYDRONIC HEATING CONTROL DEVICE

(71) Applicant: CESKE VYSOKE UCENI TECHNICKE V PRAZE, Dejvice (CZ)

(72) Inventors: Jiři Dostál, Chocen (CZ); Tomáš Bäumelt, Dvur Kralove nad Labem (CZ); Jan Hauser, Straz nad Nezarkou (CZ); Jiři Kubeš, Morasice (CZ); Jiří Valtr, Prague (CZ); Ondřej Zlevor, Turnov (CZ)

(73) Assignee: CESKE VYSOKE UCENI TECHNICKE V PRAZE (CZ)

( * ) Notice: Subject to any disclaimer, the term of this patent is extended or adjusted under 35 U.S.C. 154(b) by 171 days.

(21) Appl. No.: 17/054,662

(22) PCT Filed: May 13, 2019

(86) PCT No.: PCT/IB2019/053907
§ 371 (c)(1),
(2) Date: Nov. 11, 2020

(87) PCT Pub. No.: WO2019/220297
PCT Pub. Date: Nov. 21, 2019

(65) Prior Publication Data
US 2021/0088230 A1    Mar. 25, 2021

(30) Foreign Application Priority Data

May 14, 2018 (CZ) ................. CZ2018-225

(51) Int. Cl.
*F24D 19/10* (2006.01)
*F24D 3/02* (2006.01)
(Continued)

(52) U.S. Cl.
CPC ........... *F24D 19/1012* (2013.01); *F24D 3/02* (2013.01); *F24D 3/1058* (2013.01);
(Continued)

(58) Field of Classification Search
CPC ............. F04D 29/4293; F04D 29/4273; F04D 29/426; G05D 23/1931; F24D 19/0004;
(Continued)

(56) References Cited

U.S. PATENT DOCUMENTS 3,127,929 A * 4/1964 Ringquist ................. F24F 3/08
62/159
4,183,352 A * 1/1980 Spencer ................ F04C 11/001
126/646
(Continued)

FOREIGN PATENT DOCUMENTS

CZ     306480 B6    2/2017
EP     0015884 A1   9/1980
(Continued)

OTHER PUBLICATIONS

International Search Report (PCT/ISA/210) and Written Opinion (PCT/ISA/237) mailed on Sep. 13, 2019, by the Czech Republic Patent Office as the International Searching Authority for International Application No. PCT/IB2019/053907.

*Primary Examiner* — Steven B McAllister
*Assistant Examiner* — John E Bargero
(74) *Attorney, Agent, or Firm* — Panitch Schwarze Belisario & Nadel LLP

(57) ABSTRACT

Heat exchanger output control device in a one-pipe heating network characterized in that a first T-branch, which is connected to a second T-branch interconnected to a primary outlet pipe connection of a primary outlet pipe to a heat source through a primary outlet, is connected to the primary inlet pipe connection through a primary inlet. The first
(Continued)

T-branch is connected to a secondary supply pipe connection through a secondary supply pipe with a secondary supply temperature sensor, and the second T-branch is connected to a secondary return pipe connection through a secondary return pipe with an additional secondary return temperature sensor. An impeller of a pump is connected to a secondary circuit to pump the heat-transfer medium from the first T-branch through a heat exchanger back to the second T-branch, and to connected to a electrical motor provided with a control unit connected to secondary supply and return temperature sensors.

11 Claims, 2 Drawing Sheets

(51) Int. Cl.
 *F24D 3/10* (2006.01)
 *F24D 19/00* (2006.01)
 *F28F 27/00* (2006.01)
 *G05D 23/19* (2006.01)

(52) U.S. Cl.
 CPC .......... *F24D 19/0007* (2013.01); *F28F 27/00* (2013.01); *G05D 23/1931* (2013.01); *F24D 2220/0207* (2013.01); *F24D 2220/042* (2013.01)

(58) Field of Classification Search
 CPC ...... F24D 19/1012; F24D 3/1058; F24D 3/02; F24D 19/0007; F24D 2220/0207; F24D 2220/042; F28F 27/00; Y02B 30/70
 See application file for complete search history.

(56) References Cited

U.S. PATENT DOCUMENTS

| | | |
|---|---|---|
| 4,629,116 A | 12/1986 | Laing et al. |
| 5,443,207 A | 8/1995 | Genga |
| 5,622,221 A | 4/1997 | Genga et al. |
| 5,643,482 A * | 7/1997 | Sandelman .......... G05D 23/192 |
| | | 219/494 |
| 6,112,545 A | 9/2000 | Stethem |
| 7,648,347 B2 | 1/2010 | Laing |
| 2004/0216784 A1 | 11/2004 | Corbett |
| 2004/0262412 A1 | 12/2004 | Sweet |
| 2006/0016903 A1 | 1/2006 | Sweet |
| 2014/0222218 A1 | 8/2014 | D'Silva et al. |
| 2018/0149371 A1 | 5/2018 | Dostal |
| 2020/0063980 A1* | 2/2020 | Sørensen ................ F24D 3/125 |

FOREIGN PATENT DOCUMENTS

| | | |
|---|---|---|
| EP | 0866279 B1 | 8/2004 |
| EP | 1752852 A2 | 2/2007 |
| EP | 2778546 A1 | 9/2014 |
| EP | 3217114 A1 | 9/2017 |
| EP | 2753999 B1 | 5/2018 |

* cited by examiner

ONE-PIPE HYDRONIC HEATING CONTROL DEVICE

FIELD OF THE INVENTION

Heat supply control is a basic technological prerequisite for many industrial processes and a required element to control living space comfort. The heat from a heat source is transported via a distribution network to end heat exchangers. Then, the control of heat exchanger power is an important tool to control the temperature in associated processes or rooms.

BACKGROUND OF THE INVENTION

Currently, several solutions concerning the heat exchanger control and diagnostics system are known. There is the Czech patent No. 306480 that discloses heat exchanger power control and diagnostics using an electrical pump and several temperature measurements. The flow rate is inferred based on electric power measurements on the pump; the temperature difference on the heat exchanger is measured by the temperature sensors. Using these data and information on a heat-transfer liquid, the heat output of the exchanger is estimated. Then, the output can be controlled to achieve comfort in associated thermal zones or to diagnose heat-transfer properties of the heat exchanger and, finally, to measure the heat consumption. The solution developed herein extends the aforementioned patent by an advantageous system of connection and a possible physical form of an implementing device.

The solution of EP0866279B1 discloses the general connection of a pump to a thermal terminal unit for a heat transfer to air. The solution claims control of the pump speed depending on the heat supply demand, but no particular method is specified a specific solution cannot be made. Flow of the heat-transfer fluid through the heat exchanger is controlled by the pump speed, wherein the fact that increasing the flow rate causes an increase in heat transfer is well known.

Furthermore, there are solutions disclosed in EP 1752852, EP 2778546, U.S. Pat. Nos. 5,443,207, 5,622,221, 4,629,116, 7,648,347, wherein the mass flow of the heat-transfer medium is controlled by a pump so that the temperature of the heat-transfer medium or a thermal zone corresponds to a required value. These solutions only detect the temperature in the thermal zone. A disadvantage of these solutions is that the absolute heat output of the exchanger depends on temperatures of media entering the heat exchanger. These solutions do not deliver the heat output independently of the temperature variations of the heat-transfer media entering the heat exchanger.

To determine an actual absolute power output of a heat exchanger and to control it, it is necessary to know the current volumetric flow rate of at least one heat-transfer medium and the temperature gradient through the heat exchanger on this medium. There is a document EP 2753999, where a temperature sensor on a primary supply line and primary outlet line of an exchanger and a flow meter connected to the primary line are used. These sensory data are sent to a control unit to calculate the actual absolute power output. A motorized valve controlled by a control unit is used to change the flow rate. A disadvantage of this solution is that it uses a flow meter to measure the flow rate. Use of the flow meter significantly increases the cost of such a device. Another disadvantage is a narrow range of operative conditions due to the used actuator—a valve.

Also, there are specific device solutions known.

The solution of US20040216784A1 discloses a modular system for heating systems. Using prefabricated modules, the inventor builds heating systems of many configurations. A disadvantage of this solution is an absence of a module for a one-pipe branch with a pump.

The solution of U.S. Pat. No. 6,112,545 discloses a branch for a one-pipe heating network. This element implements closely-spaced secondary T-fittings in a co-axial design. A disadvantage of this solution is an absence of an integrated pump and temperature sensors.

The closest solutions to the solution disclosed in this document are captured in US20040262412A1 and US20060016903A1. Here the implementation of a pump-based mixing unit for low-temperature circuits is disclosed. The solution includes two pumps: one for a boiler circuit, the other for an underfloor heating circuit. The pump in the boiler circuit is used to inject the heating fluid from the boiler circuit to the floor one. The underfloor circuit pump supplies the underfloor heating manifold with pressure. This solution describes a compact integrated pump element; its disadvantage is an absence of temperature measurements and an increased number of pumps.

SUMMARY OF THE INVENTION

The above-mentioned drawbacks are largely eliminated by a one-pipe heating connection system and a device for controlling the heat exchanger power output in such connection system according to the present disclosure. The invention comprises a connection system consisting of a device connected through a secondary supply pipe connection and an exchanger supply pipe and through an exchanger return pipe and a secondary return pipe connection to the heat exchanger. Furthermore, the device is connected through a primary inlet pipe connection to the primary inlet pipe, through which the heating medium is supplied from the heat source. From the primary inlet pipe connection, it is led through the primary inlet to the first T-branch connected to the second T-branch, from which the primary outlet leads to the primary outlet pipe connection connected to the primary outlet pipe, through which the heating medium is returned to the heat source. The secondary supply pipe leads from the first T-branch to the secondary supply pipe connection. The secondary return pipe leads from the second T-branch to the secondary return pipe connection. The second T-branch is placed close to the first T-branch, so close so that the flow in the primary pipe influences the flow in the secondary pipe only negligibly. The secondary supply temperature sensor is placed so that it can sense the temperature of the heat-transfer medium entering the heat exchanger, that is, it is connected to/into the secondary supply pipe or the heat exchanger supply pipe. The secondary return temperature sensor is placed so that it can sense the temperature of the heat-transfer medium leaving the heat exchanger, that is, it is connected to/into the heat exchanger return pipe or the secondary return pipe. The pump impeller is connected in a way that it pumps the heat-transfer medium from the first T-branch through the heat exchanger back to the second T-branch, thus it is connected, with the right orientation, anywhere into the secondary circuit formed by the device secondary supply pipe, exchanger supply pipe, exchanger return pipe, and device secondary return pipe. Via force, for example, but not limited to, by shaft or magnetically, the pump impeller is connected to the electric motor connected to the control unit via an electric connection. Through the electric motor, the control unit allows to control the flow of fluid through the secondary circuit continuously from almost zero to the maximum achievable flow rate occurs at maximum pump speed. Via cable or wireless, the secondary supply temperature sensor is connected by a communication channel to the control unit, so that information about the secondary supply temperature is available to the control unit. Via cable or wireless, the secondary return temperature sensor is connected by a communication channel to the control unit, so that information about the secondary return temperature is available to the control unit.

The device described above is used to estimate and control the heat flow as follows. Absolute heat flow transferred from the heat-transfer fluid $\dot{Q}[W]$ is calculated from the equation $$\dot{Q} = \dot{m}_s c_p (T_{s,supply} - T_{s,return})$$

where $\dot{m}_s$ [kg/s] is the mass flow rate of the heat-transfer fluid through the secondary circuit; $c_p$[J/kg/K] is the specific heat capacity of the heat-transfer fluid; $T_{s,supply}$[° C.] is the temperature of the heat-transfer fluid in the secondary supply pipe; and $T_{s,return}$[° C.] is the temperature in the secondary return pipe. The mass flow rate is estimated based on the electrical input power of the pump motor and the known relationship between the pump speed, electrical input power and flow rate—as described in Czech Patent No. 306480. The accuracy of the flow estimation can be greatly improved by the connection described above. Due to the constant hydraulic resistance of the secondary circuit and the connection to the primary circuit close to by the T-branches positioned closely together and therefore not affecting the secondary circuit by pressure variations, the flow information can be obtained also from the pump pressure characteristic and the secondary circuit pressure characteristic estimated by the inferential sensor. There is a memory in the control unit where the pump pressure characteristics are saved.

Furthermore, in the control unit memory, there is space, where the value of the maximum required absolute heat flow is saved. This value can be changed remotely via data communication or manually via the maximum heat flow selector at an accessible location on the device surface. In addition, the heat flow reference signal through the data communication or through the analog heat flow reference line enters the control unit. The heat flow reference signal is a value ranging from 0 to 100%. By multiplying the value of the heat flow reference value by the maximum required heat flow rate, the control unit calculates the absolute heat flow reference value. Then, the control unit controls the pump speed, continuously from nearly zero speed to maximum speed so that the estimated absolute heat flow value approaches asymptotically the absolute heat flow reference value.

The advantage of the described exchanger connection is a more precise deduction of the exchanger absolute heat flow, and thus improved precision of the heat flow control. In addition, more precise output estimate is linked to the more precise measurement of heat consumption and more precise thermal diagnostics of the heat exchanger.

Another aspect of the invention is a device.

In a preferred embodiment, the solution is implemented by a device that integrates primary inlet pipe connection, primary inlet pipe of the device, first T-branch, second T-branch, primary outlet, primary outlet pipe connection, secondary supply pipe, secondary supply pipe connection, secondary return pipe, secondary return pipe connection, secondary supply temperature sensor, communication channel, secondary return temperature sensor, communication channel, pump impeller, electric motor, electrical connection, and control unit into one device. A maximum heat flow selector is placed accessibly on the device to set manually the absolute heat flow value. The device is powered and communicates via power and communication cables. In addition, the device includes a connector to connect an analog heat flow reference line.

The advantage of the disclosed device is that by integration of the aforementioned elements into one device, the number of mechanical connections required for installation is significantly reduced. This reduces the risk of faulty installation and/or the number of leaks from the heating circuit. Furthermore, the integration into one device is advantageous in that the connection to the primary pipe is known and non-changing, which further increases the heat flow estimation accuracy. Another advantage consists in the significantly simplified design of the one-pipe system. For example, in the case of designing a two-pipe network with pressure-independent valves, it is necessary to respect the narrow operational conditions of the valve and to select the right one from a wide model range. The device of the disclosure allows controlling a wide range of heat exchangers, simplifying the design process.

EXPLANATION OF DRAWINGS

Specific embodiments of the technical disclosure are shown schematically in the accompanying drawings. Wherein.

EXAMPLES OF THE INVENTION EMBODIMENTS

Figure 1:
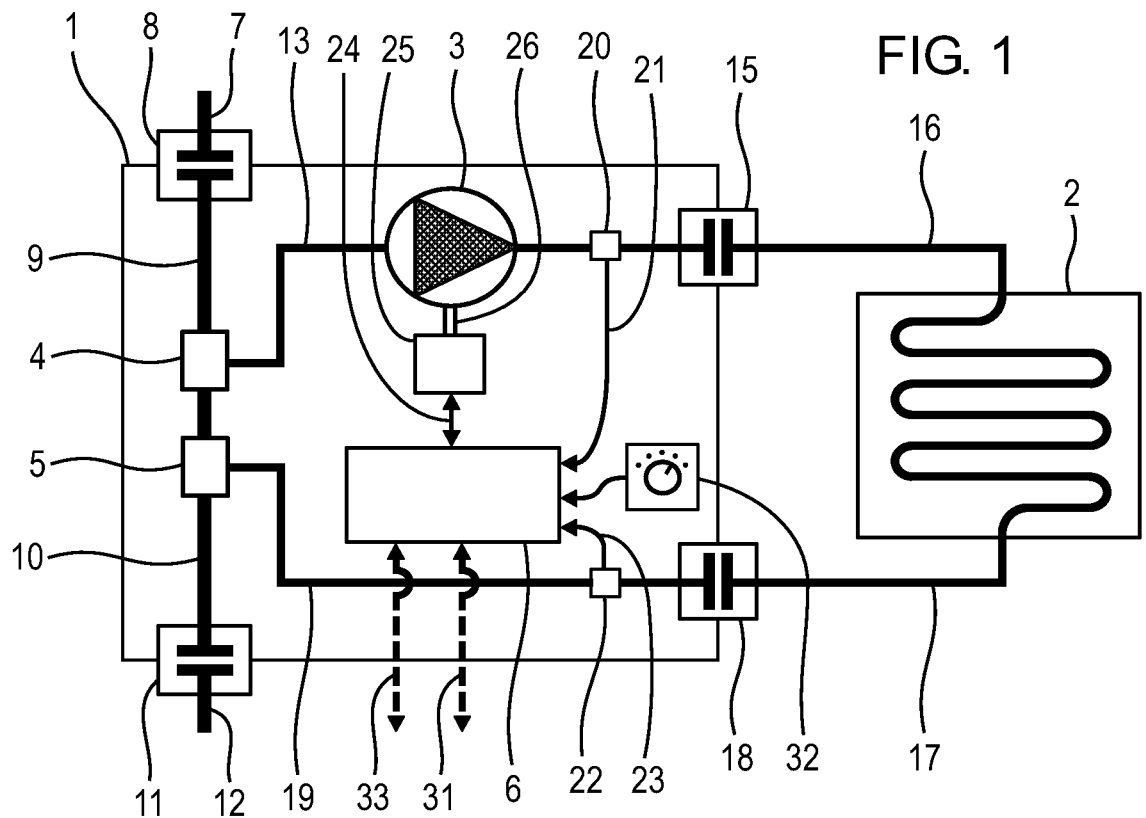
FIG. 1 shows a connection diagram implementing the device for heat exchanger output control in a one-pipe heating network.

The connection consists of the device 1 connected through the secondary supply pipe connection 15 and the supply pipe 16 of the heat exchanger 2, and through the return pipe 17 of the heat exchanger 2 and the secondary return pipe connection 18 to the heat exchanger 2. Furthermore, the device 1 is connected through the primary inlet pipe connection 8 to the primary inlet pipe 7, through which the heating medium is supplied from a heat source. From the primary inlet pipe connection 8, the primary inlet 9 is led to the first T-branch 4 connected to the second T-branch 5, from which the primary outlet 10 leads to the primary outlet pipe connection 11 connected to the primary outlet pipe 12, through which the heating medium is returned to the heat source. The secondary supply pipe 13 of the device 1 leads from the first T-branch 4 to the secondary supply pipe connection 15. The secondary return pipe 19 of the device 1 leads from the second T-branch 5 to the secondary return pipe connection 18. The secondary supply temperature sensor 20 is placed so that it can sense the temperature of the heat-transfer medium entering the heat exchanger 2, that is, it is connected to/into the secondary supply pipe 13 or the supply pipe 16 of the heat exchanger 2. The secondary return temperature sensor 22 is placed so that it can sense the temperature of the heat-transfer medium leaving the heat exchanger 2, that is, it is connected to/into the return pipe 17 of the heat exchanger 2 or the secondary return pipe 19. The pump impeller 3 is connected to pump the heat-transfer medium from the first T-branch 4 through the heat exchanger 2 back to the second T-branch 5. Thus, it is connected in correct orientation anywhere to the secondary circuit formed by the secondary supply pipe 13 inlet pipe 16 of the heat exchanger 2 return pipe 17 of the heat exchanger 2, and secondary return pipe 19. Via force, in contact or contactless, using the force connection 26, the pump impeller 3 is connected to the electric motor 25 connected to the control unit 6 through electrical connection 24. Via cable or wireless, the secondary supply temperature sensor 20 is connected by first communication channel 21 to the control unit 6, so that information about the secondary supply temperature is available to the control unit 6. Via cable or wireless, the secondary return temperature sensor 22 is connected by second communication channel 23 to the control unit 6, so that information about the secondary return temperature is available to the control unit 6. The control unit 6 senses the signal from the maximum required heat flow selector 32 and writes it to the control unit 6 memory to a space intended for the maximum required heat flow. The value of the maximum required heat flow can also be modified via the data line 31. Further, the control unit 6 senses the heat flow reference value from the heat flow reference line 33, or communicates the heat flow reference value via the data line 31. By multiplying the value of the maximum required heat flow by the heat flow reference value, the control unit 6 calculates the absolute heat flow reference value, subsequently adjusting the pump 3 speed so that the estimated absolute heat flow approaches asymptotically the absolute heat flow reference value.

Figure 2:
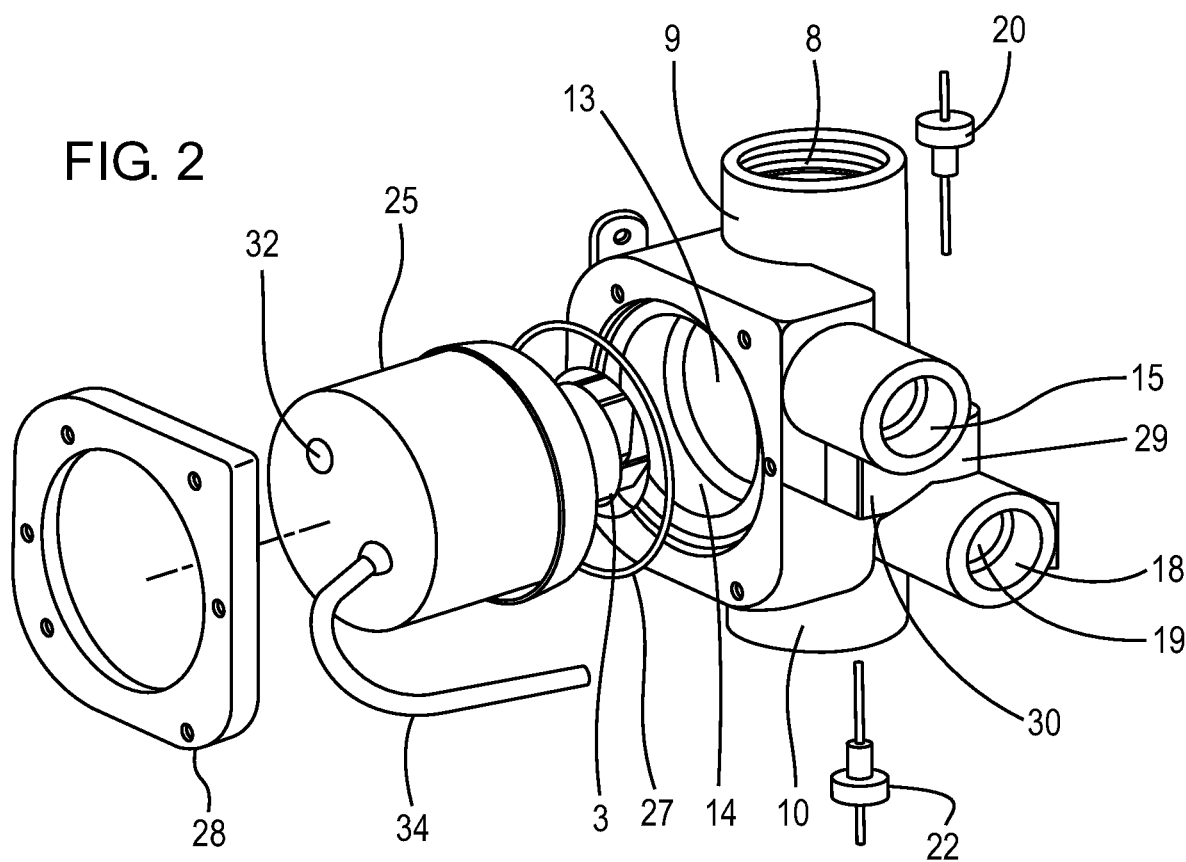
FIG. 2 is an axonometric view of the device used to control the heat exchanger in a one-pipe network.

The device of FIG. 2 represents an embodiment of the device 1 according to connection of FIG. 1, integrating primary inlet pipe connection 8, primary inlet 9, first T-branch 4, second T-branch 5, primary outlet 10, primary outlet pipe connection 11, secondary supply pipe 13, secondary supply pipe connection 15, secondary return pipe 19, secondary return pipe connection 18, secondary supply temperature sensor 20, communication channel 21, additional secondary return temperature sensor 22, additional communication channel 23, pump impeller 3, electric motor 25, electrical connection 24 and control unit 6. Of which the communication channel 21, the additional communication channel 23, the electrical connection 24, and the control unit 6 are not shown. FIG. 2 shows that a spatially important element is the housing 14 of the pump 3. In a preferred structural embodiment, the housing 14 of the pump 3 is integrated with the T-branches 4 and 5 to form a compact device 1 with a small number of necessary mechanical connections. The electric motor 25 and the pump impeller 3 are caulked to the housing 14 of the pump 3 using the gasket 27 and mechanically fastened using the collar 28, which is fixed to the device 1 body by standard screws. On the device 1 body, there is also shown the base 30 of the temperature sensor 20 on the secondary supply pipe and the base 29 of the temperature sensor 22 on the secondary return pipe. The control unit 6 is integrated into the electric motor 25. At an accessible location on the electric motor 25, the maximum required heat flow selector 32 is located. The required exchanger heat output of 0 to 100% is communicated digitally via data line 31 or by an analog signal, current or voltage, via line 33 of the heat flow reference. The cable 34 is a combination of the device power cable and the data line 31 through which the device communicates with the master computer and/or other devices in one heating network.

Figure 3:
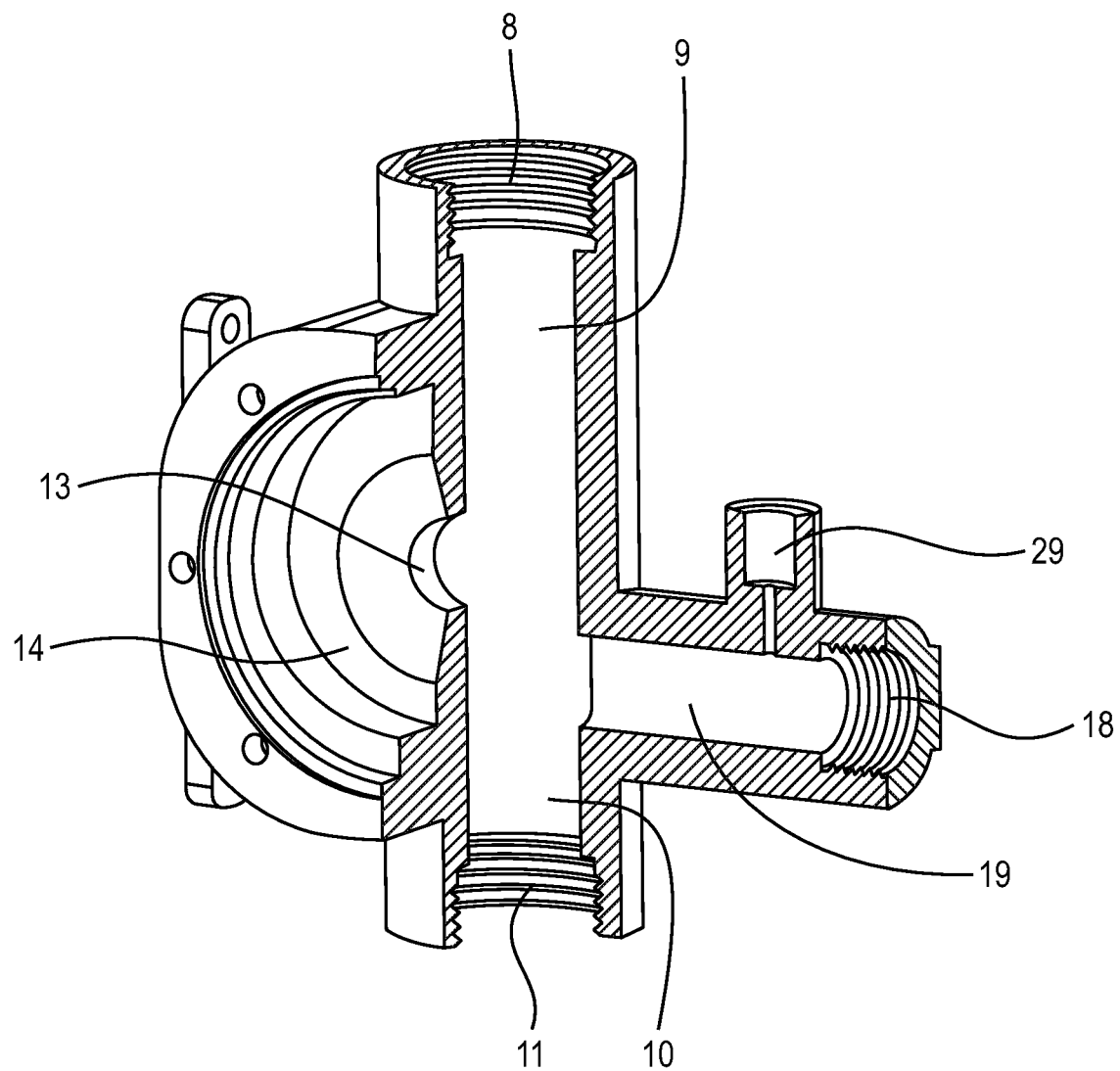
FIG. 3 shows a quarterly section illustrating the inner composition.

FIG. 3 shows a cross-section of the device 1 body, where the first T-branch 4, i.e. the connection of the secondary supply pipe 13 to the primary inlet 9 is better visible. Further, the second T-branch 5, i.e., the connection of the secondary return pipe 19 to the primary outlet 10 is visible as well.

INDUSTRIAL APPLICABILITY

In particular, the device for heat exchanger output control in a one-pipe heating network of the present invention finds its use in heating systems of buildings and in controlling industrial thermal processes.

The invention claimed is:
1. One-pipe hydronic heating control device comprising:
a secondary supply pipe connection on an inlet pipe of an exchanger;
a secondary return pipe connection on a return pipe of the exchanger;
a primary inlet pipe connection on a primary inlet pipe from a heat source and a primary outlet pipe connection on a primary outlet pipe to the heat source; and
a pump impeller provided with a control unit to pump heat-transfer medium,
wherein a first T-branch, which is connected to a second T-branch interconnected through a primary outlet, is connected to the primary inlet pipe connection through a primary inlet pipe,
wherein a first T-branch is connected to the secondary supply pipe connection through a secondary supply pipe with a secondary supply temperature sensor,
wherein the second T-branch, which is connected to the primary outlet, is connected to the secondary return pipe connection through a secondary return pipe with a secondary return temperature sensor and the pump impeller is connected to the secondary circuit such that it pumps the heat-transfer medium from the first T-branch through the heat exchanger back to the second T-branch,
wherein the hydraulic resistance of the connection is negligible with respect to the hydraulic resistance of the inner primary inlet pipe, and
wherein the pump impeller is connected to an electric motor, the electric motor is interconnected to and controlled by the control unit, and the control unit is interconnected with the secondary supply temperature sensor and/or the primary inlet temperature sensor and the secondary return temperature sensor.

2. The one-pipe hydronic heating control device according to claim 1, wherein it is a compact unit integrating the primary inlet pipe connection of the primary inlet, the first T-branch, the second T-branch, the primary outlet pipe connection of the primary outlet, the secondary supply pipe of the secondary supply pipe connection, the secondary return pipe of the secondary return pipe connection, the secondary supply temperature sensor, the secondary return temperature sensor, pump impeller with electric motor and control unit.

3. The one-pipe hydronic heating control device according to claim 2, wherein the compact unit is provided with a housing of the pump.

4. The one-pipe hydronic heating control device according to claim 3, wherein the housing of the pump is integrated with the T-branches.

5. The one-pipe hydronic heating control device according to claim 1, wherein the compact unit is provided with a base for the temperature sensor on the secondary supply pipe and a base for the temperature sensor on the secondary return pipe.

6. The one-pipe hydronic heating control device according to claim 1, wherein it is provided with a selector to adjust the maximum heat flow in Watts and/or equivalent heat flow units.

7. The one-pipe hydronic heating control device according to claim 1, wherein it is provided an analog input for the heat flow reference with defined limits for 0 and 100%.

8. The one-pipe hydronic heating control device according to claim 1, wherein a data line connected to the master computer and/or to another control unit is connected to the control unit.

9. The one-pipe hydronic heating control device according to claim 1, wherein the first T-branch is located in close proximity to the second T-branch such that flow of the heat-transfer medium in the primary inlet pipe negligibly influences the flow in the secondary supply pipe.

10. The one-pipe hydronic heating control device according to claim 1, wherein the pump impeller is connected to an electric motor provided with the control unit interconnected with the secondary supply temperature sensor and the primary inlet temperature sensor and the secondary return temperature sensor.

11. The one-pipe hydronic heating control device according to claim 1, wherein the pump impeller is connected to an electric motor provided with the control unit interconnected with the secondary supply temperature sensor or the primary inlet temperature sensor and the secondary return temperature sensor.

* * * * *